United States Patent [19]
Smith et al.

[11] Patent Number: 5,964,156
[45] Date of Patent: Oct. 12, 1999

[54] OPTIMIZING WORKFLOW IN A PREPRESS PRINTING SYSTEM

[75] Inventors: David D. Smith, Londonderry, N.H.; Jeremy C. Catt, Norht Andover, Mass.

[73] Assignee: AGFA Corporation, Wilmington, Mass.

[21] Appl. No.: 09/090,070

[22] Filed: Jun. 3, 1998

Related U.S. Application Data

[60] Provisional application No. 60/048,603, Jun. 4, 1997.

[51] Int. Cl.$^6$ ........................................................ B41C 1/10
[52] U.S. Cl. ........................ 101/471; 347/262; 707/520; 395/109; 395/111; 395/117; 359/196; 101/483
[58] Field of Search ...................................... 101/483, 477, 101/453, 465, 467, 471; 707/520; 345/418; 347/262, 260, 172; 395/109, 111, 115, 117; 359/196, 210

[56] References Cited

U.S. PATENT DOCUMENTS

| | | | |
|---|---|---|---|
| 5,590,245 | 12/1996 | Leamy et al. | 345/418 |
| 5,634,091 | 5/1997 | Sands et al. | 101/453 |
| 5,663,554 | 9/1997 | Henry | 359/210 |
| 5,692,112 | 11/1997 | Brady | 395/115 |
| 5,699,099 | 12/1997 | Garand et al. | 347/172 |
| 5,738,014 | 4/1998 | Rombult et al. | 101/477 |
| 5,809,360 | 9/1998 | Blake et al. | 101/477 |
| 5,815,243 | 9/1998 | Bailey et al. | 101/453 |

*Primary Examiner*—Eugene Eickholt
*Attorney, Agent, or Firm*—Robert A. Sabourin

[57] ABSTRACT

A method for automatically processing a job in a prepress printing environment includes the steps of: moving an image receiving substrate from a storage bin to a staging area; moving the image receiving substrate from the staging area into a drum; imaging a predefined area of the image receiving substrate in the drum with a laser while simultaneously moving a next image receiving substrate from the storage bin to the staging area; upon completion of the imaging of the image receiving substrate in the drum, simultaneously (a) moving the image receiving substrate from the drum into a processing area for developing an image on the image receiving substrate, and (b) moving the next image receiving substrate from the staging area into the drum; and finally repeating the above steps until the job is completed. The method optionally includes: offsetting the position of the image receiving substrate to alter the location upon the image receiving substrate where the image will be burned; or offsetting the laser position to alter the location upon the image receiving substrate where the image will be burned. A slug line can also be printed at print time outside of the predefined area, and can include identifying information such as a job name, a print drive job identification, a time stamp, a plane name, a page number and user-defined graphics.

18 Claims, 12 Drawing Sheets

| JOB OUTPUT STATE | DEFINITION |
|---|---|
| NONE | JOB DOES NOT HAVE AN OUTPUT STATE YET |
| HOLD | JOB WILL NOT IMAGE, MANUAL HOLD |
| HOLD WITH CONDITION | JOB'S HOLD CONDITION DOES NOT MATCH PREFERENCE |
| READY | JOB IS ELIGIBLE TO IMAGE |
| IMAGING | JOB IS CURRENTLY IMAGING |
| COMPLETE | JOB HAS COMPLETED IMAGING |
| ERROR | JOB ENTRY HAS ERRONEOUS INFORMATION |
| ABORTED | IMAGING JOB HAS BEEN ABORTED |
| SUSPENDED | JOB IMAGING HAS BEEN PAUSED |
| PRIORITY MISMATCH | JOB'S PRIORITY DOESN'T PASS THE PREFERENCE CHECK |
| ENGINE MISMATCH | JOB'S INTENDED ENGINE IS NOT CONNECTED |
| MEDIA MISMATCH | JOB'S INTENDED MEDIA IS NOT AVAILABLE |
| DEFERRED | JOB WAS DEFERRED FROM IMAGING |
| INVALID | JOB CHARACTERISTICS ARE INVALID WITH CONNECTED ENGINE |

FIG. 5

OPTIMIZING WORKFLOW IN A PREPRESS PRINTING SYSTEM

This application claims the benefit of U.S. Provisional patent application No. 60/048,603 filed on Jun. 4, 1997.

The invention relates generally to imagesetting and electronic prepress systems and methods for enhancing system workflow. More particularly, the present invention is directed towards automated systems and methods for optimizing the workflow in a prepress system.

BACKGROUND OF THE INVENTION

As known in the art of electronic prepress systems, a selected output device, such as an imagesetter, printer or platesetter, is typically electrically connected to a dedicated raster image processor (RIP) connected between a front-end computer (hereinafter "front-end") and the output device. Electronic prepress image data file sizes are often greater than 100 megabits per page, and the large file requirements have historically restricted electronic prepress systems to dedicated proprietary hardware and software systems which use parallel data transfer methods to provide high speed data transfer rates between the front-end, the RIP and the output device.

More recently, use of page description languages, such as Postscript™, have allowed object oriented descriptions of large image data files containing both text and graphics to be transferred efficiently over serial data communication lines, as used in network systems and adopted in electronic prepress systems, for transferring serial image data in page description formats between a front-end and a RIP. Serial data transfer systems offer the advantage that two way communications between the front-end and the RIP allow status information and other commands and files to be transferred in either direction.

The RIP is said to "rasterize" a PDL image file by performing operations such as image screening, color separating, imposition, trapping and various other prepress image preparation operations upon the PDL image data to yield raster image data in bitmap format. The raster image data is then transferred to the output device over a parallel data transfer interface in order to provide an efficient data transfer rate, thereby, keeping the output device operating at a desired operating speed. Typically, the process of rasterizing or RIPing data has been slow, sometimes causing the output device to remain idle while waiting for a RIP to prepare the next bitmap image file.

Even more recently the use of a RIP multiplexer (MUX), e.g. MULTISTAR® offered by Bayer Corporation, Agfa Division in Wilmington, Mass., has offered the electronic prepress industry some improvement in data throughput and cost savings, by functioning as a page buffer between one or two RIPs, and a single output printing device. Cost savings and improved efficiency have been realized by either RIPing a PDF image data file with a first RIP while transferring a previously RIPed image data file to the output device or by storing a RIPed image data file for transfer to the output device at an appropriate time after RIPing. This more fully utilizes the output device, or print engine, which is typically an expensive resource. In fact, keeping the print engine busy is a key design goal of any electronic prepress system design.

One problem of the prior art has been that in order to transfer bitmap data between a RIP and a MUX, or between a MUX or a RIP and an output device, it has been necessary to use a parallel communication interface in order to provide data transfer rates which are fast enough for transferring very large image data files, e.g. image data files in excess of 100 megabits per page, at rates which provide efficient workflow. Prior art bitmap data parallel transfer interface systems, eg. Agfa Printer Interface Standard (APIS) or Small Computer Systems Interface (SCSI) systems, use a data transfer protocol to identify the data file format and convert serial data into 8 bit parallel data formats. Then, the 8 bit data is transferred over parallel data interface cables which provide a plurality of separate wires bundled together, each transmitting data in parallel. However, since parallel data transfer methods are restricted to one way data transfer, e.g. between the RIP and MUX or between the MUX or RIP and an output device, a serial data channel has also been provided bundled within, or in addition to, the parallel data interface cable to provide two way communication for protocol and other message or file communication between the RIP and the MUX or between the RIP or MUX and the output device or between the front-end and the RIP, the MUX or the output device. One significant drawback of a parallel data transfer interface has been that the cable length is limited in order to maintain efficient and effective data transfer. In some operations, cable length may be limited to about 25 feet requiring that the RIP, MUX and output device each be locally connected to each other and usually all within the same room. This shortcoming of the prior art has limited prepress systems to local connectivity and slowed the development of automation features needed in modem prepress workflow environments. A need exits for better overall control of the RIP, MUX and output process by a system administrator. Features such as job queuing, equipment swapping, and manipulating, editing, storing and transferring previously RIPed bitmap image data are needed in the modern prepress environment.

For electronic prepress systems which have employed imagesetters as print engines to create pages, typically, these devices have been driven by a dedicated RIP or a MUX. The RIP/Imagesetter or RIP/MUX/Imagesetter combination has been very productive in creating pages. Except for the most complex jobs, the RIP has advanced so that it is not the bottleneck in the pre-press workflow of page creation.

Today's needs for developing large format imagesetters, platemakers and on-press plate imaging, go well beyond creating just pages. These devices produce press size flats in film or plate that may contain four, eight, or more pages. These devices have also been driven by a RIP or MUX, but unlike page format imagesetters, the RIP can be the bottleneck in creating press format films and plates.

As the needs of the electronic prepress industry steadily move towards large format imagesetters and the direct-to-plate workflow, it becomes imperative that the output devices be supplied data at rates which meet their specified throughput requirements. This means that the workflow system must be able to perform at or better than print engine speed. Notwithstanding the advent of RIPs operating at faster processing speeds, direct RIP to print engine configurations cannot guarantee meeting these requirements, especially as large-format, very complex jobs become more and more common.

In addition, with the advent of platesetters and direct-to-press prepress systems, a need also exists to provide a digital proofing device capable of providing either a color or black and white proof of the final image since films which used to provide analog proofs have often been eliminated from the prepress workflow. Such proofing systems may accept image files as page description data, screened bitmap data or bitmap data which has not been screened. A need therefore exists to redirect image data to a proofer, and that data may need to be prepared in an appropriate format for output by the proofer.

Typically for electronic prepress and imagesetting systems of the prior art, a print job (hereinafter a "job") required that a specific output device be connected to the system before the job could be processed. For example, a job requiring a particular imagesetter for an output device, or a particular medium type or size loaded onto the output device, could not be processed into raster data if the particular output device and corresponding media requirements were not met. Such a condition may cause a system delay or require that a front-end operator physically change the medium or output device connected to the RIP in order to continue processing and outputting image files.

Since the electronic and imagesetting systems of the prior art were not only device-dependent but medium-dependent as well, the queuing of rasterized print jobs was not possible. Thus, the choice of the output device and print medium proved to be a considerable hindrance in productivity.

Another expensive resource, front-end operators, are kept busy by controlling the transfer of bitmap image data between a RIP and a MUX. Burdening these operators with control of the output process reduces overall system efficiency. By moving control of the RIPing and image output process to a system administrator, the front end operator and the front-end itself become free to function more efficiently.

One shortcoming of electronic prepress systems of the prior art has been the inability to automatically control and monitor the queuing of output jobs and to make changes in the order or priority of image output either from the RIP of from the output device. Another shortcoming is the lack of efficiency in a computer-to-plate system which is caused by inactive components. Another shortcoming is the inability to accommodate different size image receiving substrates when burning an image. Yet another shortcoming is the inability to adequately mark a plate during printing without marring the image in order to provide real-time identification information such as the identify of a job, a time stamp indicating when the job is completed, an operator identifier, a print engine identifier, a customer identification number, user defined graphics, etc. The above and other shortcomings are addressed and overcome in view of the claimed invention as supported in the attached description and drawings.

SUMMARY OF THE INVENTION

A method for automatically processing a job in a prepress printing environment includes the steps of: moving an image receiving substrate from a storage bin to a staging area; moving the image receiving substrate from the staging area into a drum; imaging a predefined area of the image receiving substrate in the drum with a laser while simultaneously moving a next image receiving substrate from the storage bin to the staging area; upon completion of the imaging of the image receiving substrate in the drum, simultaneously (a) moving the image receiving substrate from the drum into a processing area for developing an image on the image receiving substrate, and (b) moving the next image receiving substrate from the staging area into the drum; and finally repeating the above steps until the job is completed. The method optionally includes: offsetting the position of the image receiving substrate to alter the location upon the image receiving substrate where the image will be burned; or offsetting the laser position to alter the location upon the image receiving substrate where the image will be burned. A slug line can also be printed at print time outside of the predefined area, and can include identifying information such as a job name, a print drive job identification, a time stamp, a plane name, a page number and user-defined graphics. The above methods can be implemented into a prepress printing system as described hereinafter.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein:

FIG. 5 is a table defining various job output states;

DETAILED DESCRIPTION OF THE PREFERRED EMBODIMENTS

The following terms are defined for use throughout this patent application.

| | |
|---|---|
| APIS | Agfa Print Engine Interface is a proprietary point to point data transmission protocol consisting of a serial bi-directional command channel (APIS serial) and a parallel uni-directional data channel (APIS video). |
| Device API | Generic Application Programming Interface for output devices. |
| Engine | A hardware device capable of receiving and printing raster image data on film or other media. An output printing device. Also referred to as "print engine". |
| Fast Ethernet (100 BaseT) | Communication medium, 100 Mb/sec maximum transfers over twisted pair wire. |
| File | Storage for one separation, i.e. each separation or plane of a job is stored in its own file. |
| GUI | Graphical User Interface which most broadly represents all the hardware, software and firmware necessary to implement interaction between the computer system and the user. Typically a keyboard, mouse, monitor and associated drivers and programs. |
| Job | One or more related pages together constitute a "job". |
| Job Control Server | The print drive subsystem that controls access to the print drive Job List and job entries on the list. |
| Job List | This is a user created list of jobs to be imaged, i.e. printed, under the control of the print drive system. |
| Job State | Current read-only State of a Job. (E.g., Hold, Imaging, Spooling, etc.). |
| MUX | Multiplexer |
| Page | One or more related separations together constitute a "page". For example, the cyan, magenta, yellow, and black separations for page 3. |

-continued

| | |
|---|---|
| Pickable Job | A job which passes all the user defined criteria checks. |
| Plane | Same as Separation |
| PDF | Page description format |
| Print drive configuration server | The print drive subsystem that controls print drive client access to the Windows NT registry section for the print drive. |
| Registry | Place in NT where static information about installed software is held. |
| RIP | Raster image processor. This device RIPS or rasterizes object-oriented PDF files into bitmapped raster data. |
| SCSI | Small Computer System Interface is a standard high-speed parallel interface defined by the X3T9.2 committee of the American National Standards Institute (ANSI). Used for connecting microcomputers to peripheral devices, other computers and local area networks. |
| Separation | A single 1-bit raster image as output from a RIP. A separation is an image representation of a single color channel. For example, "the cyan separation". This is also referred to as a "plane". One separation is stored in a file. |
| Spindle | Choice of media holding device for use on an engine. |
| Spooling | Inputting a job. |

Figure 1:
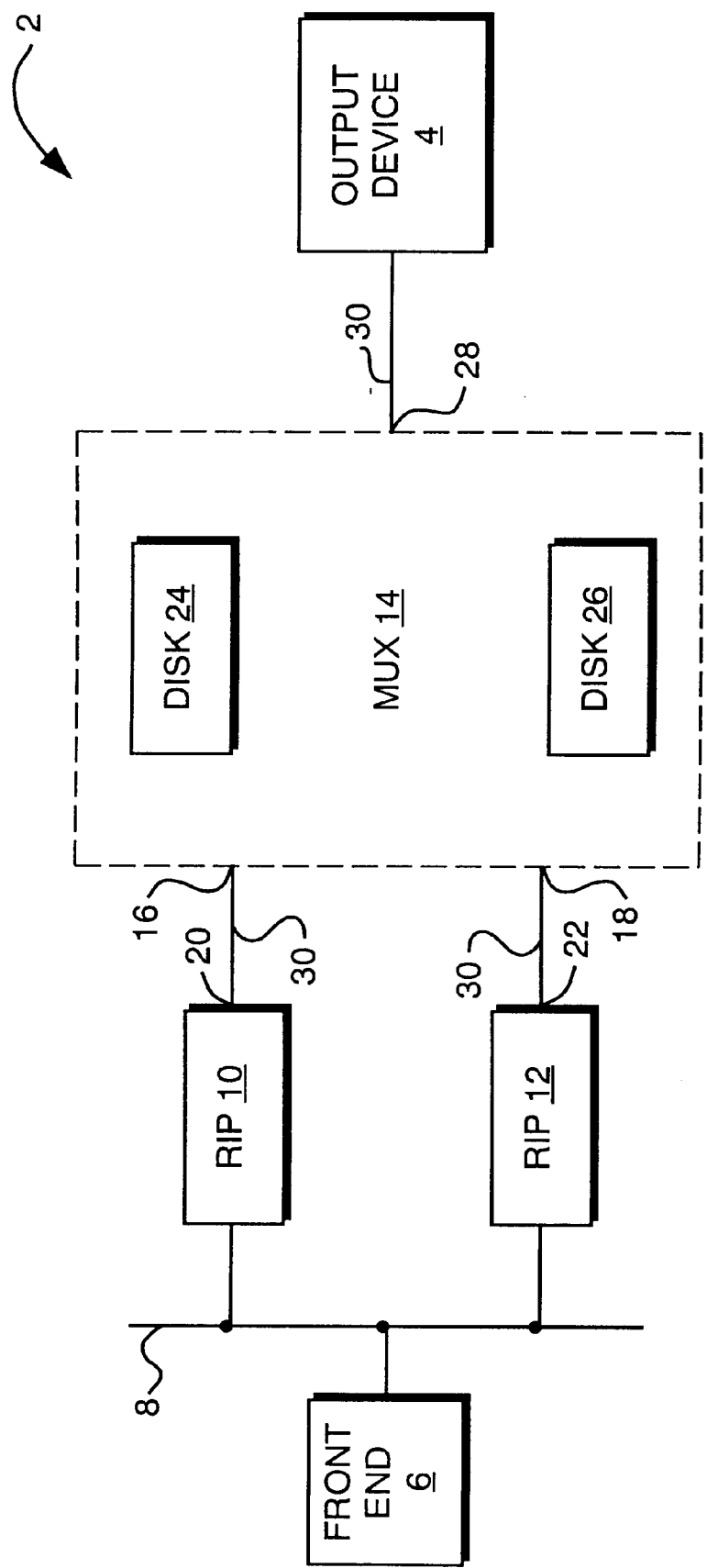
FIG. 1 is a block diagram of a prior art electronic prepress system.

FIG. 1 illustrates a prior art prepress system, referred to generally by reference numeral 2 comprising an output device 4, at least one computer terminal or front-end 6, for creating, editing or otherwise preparing image data for printing and especially halftone black and white or color printing as may be output by an imagesetter or platesetter for eventual image reproduction by a printing press using a printing plate. The front-end 6 is connected via a network serial data interface 8 to two raster image processors 10 and 12. The RIPs 10 and 12 receive, from the front-end 6, image data which is typically in the form of a page description language or other object oriented text and graphic representation of the image to be printed.

A multiplexer 14 includes two input ports 16 and 18 connected to the output ports 20 and 22 of the RIPs 10 and 12, respectively. Two large format disk drives 24 and 26 act as image data buffers which are included in the MUX 14 for storing image data. The primary purpose of the MUX 14 is to function as a page buffer for the output device 4. A MUX output port 28 connects with the output device 4. In the prior art, all data transferred from the RIP output ports 20 and 22 to the MUX 14, or from the MUX 14 to the output device 4, or within the MUX 14 to the disk drives 24 and 26 has been converted to bitmap raster data. The data transfer has been made over parallel data transfer cables 30.

As previously stated, the shortcomings of the prior art have included the inability to manage the RIPing and outputting functions of the prepress process by a system administrator and the costly proprietary hardware with few, but costly, expansion opportunities provided for the prepress customer. However, RIP and output management has been addressed in the priority U.S provisional patent application No. 60/048,603 where a print driver is employed as a replacement for, and an extension of, the multiplexer 14 of the prior art.

Figure 2:
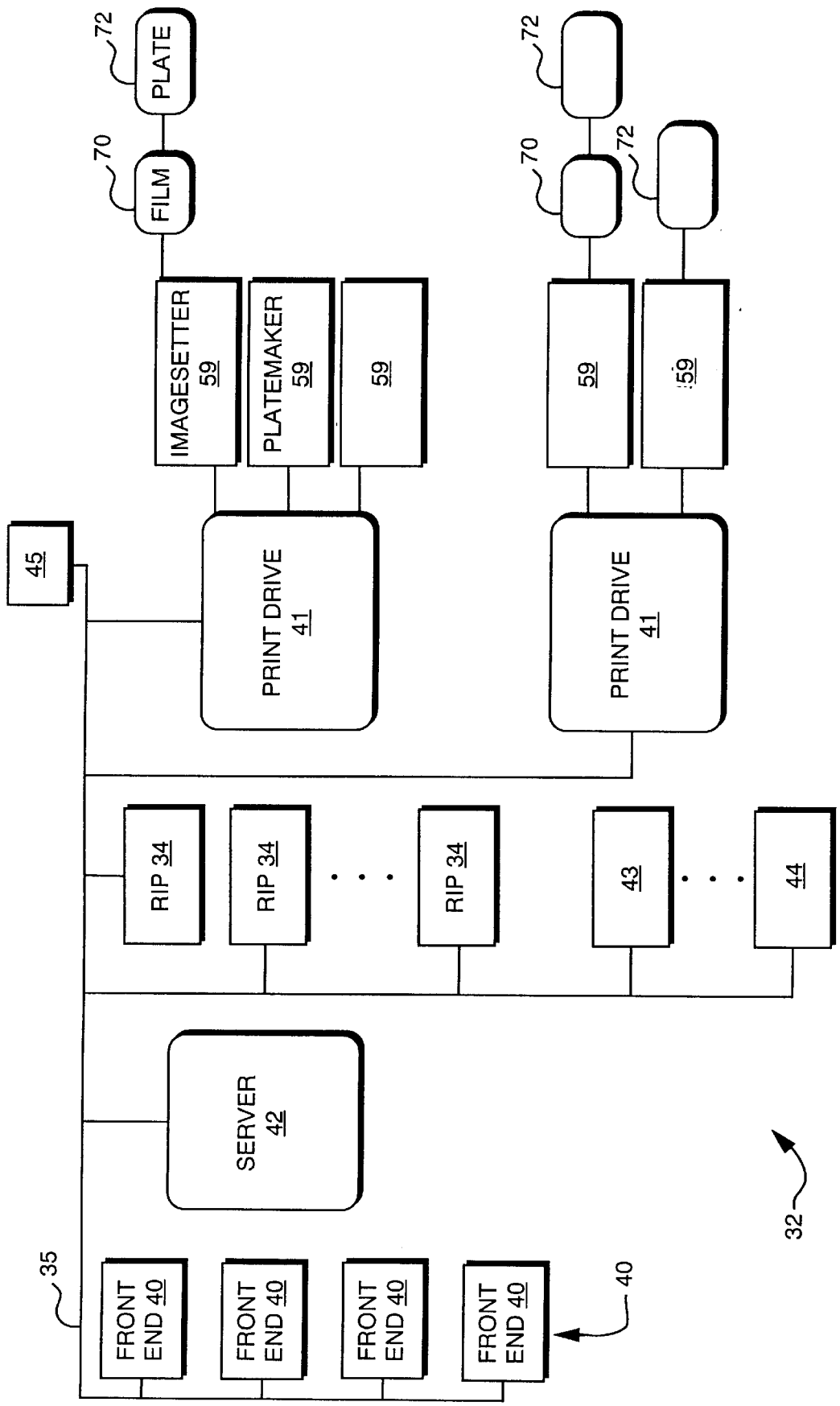
FIG. 2 is a block diagram of one configuration of a prepress printing system which can be used to implement a job selection method.

FIG. 2 is a block diagram of a preferred hardware embodiment of a prepress system including one or more print drives in which the job selection method can be implemented. The various components of the prepress system 32 are preferably interconnected via a fast Ethernet network 35 utilizing TCP/IP data transfer protocol. The prepress system 32 is configured for controlling RIPing and output workflow and for providing more flexible operating and expansion options to the prepress customer. This prepress system 32 includes: one or more RIPs 34; one or more front-ends 40; one or more print drives 41; one or more servers 42 for storing image and other data files; one or more proofers 43 or other output devices 44 (such as a printer); and another computer system 45 which may be used for system to administration. Each of the above and any other added network components may be either locally or remotely interconnected.

One or more output devices 59 are connected to the print drives 41. The output devices 59 may include any output devices which are used in a prepress system or in a printing environment, such as a printer, a print engine, a proofer, a filmsetter, an imagesetter, a platemaker or a computer-to-plate system. In any case, the output device 59 generates raster bitmap image data representing halftone or otherwise screened images for eventual transfer onto a film 70 or a printing plate 72 for reproduction by a printing press (not shown). Such output devices 59 may require proprietary or non-proprietary serial or parallel image data transfer from the print drives 41 of may require descreened bitmap data when the output device is a proofer 43, for providing a continuous tone proof of the image to be reproduced.

The RIPs 34 may be software RIPs or they may be dedicated hardware RIPs, such the Agfa Star™ hardware RIP available from Bayer Corporation, Agfa Division in Wilmington, Mass. Each RIP 34 appears on the fast Ethernet network 35 and can be accessed by any front-end 40, server 42, print drive 41 or other computer system 45, any of which may by either local or remote.

Each front-end 40, server 42, print drive 41 and other computer 45 is essentially a separate computer system each operating preferably on Windows NT™, although any available operating system can be used, such as a UNIX™ or a MAC OS™. An IBM PC™ or clone could be used for a print drive 41.

As described in the priority U.S provisional patent application No. 60/048,603, each RIP 34 includes a data compression module for compressing bitmap data. The compression module facilitates the use of serial bitmap data transfer over the fast Ethernet network 35, instead of parallel bitmap data transfer, by substantially compressing files to a size which allows for serial data transfer. The compression module compresses RIPed data which can be transferred either directly, or over the network 35, to one or more output devices 59 or to one or more print drivers 41. In the preferred case, each RIP 34 includes both a fast Ethernet interface board which facilitates transfer of the compressed data via TCP/IP protocol, and a data decompression board for decompressing the compressed data.

Figure 3:
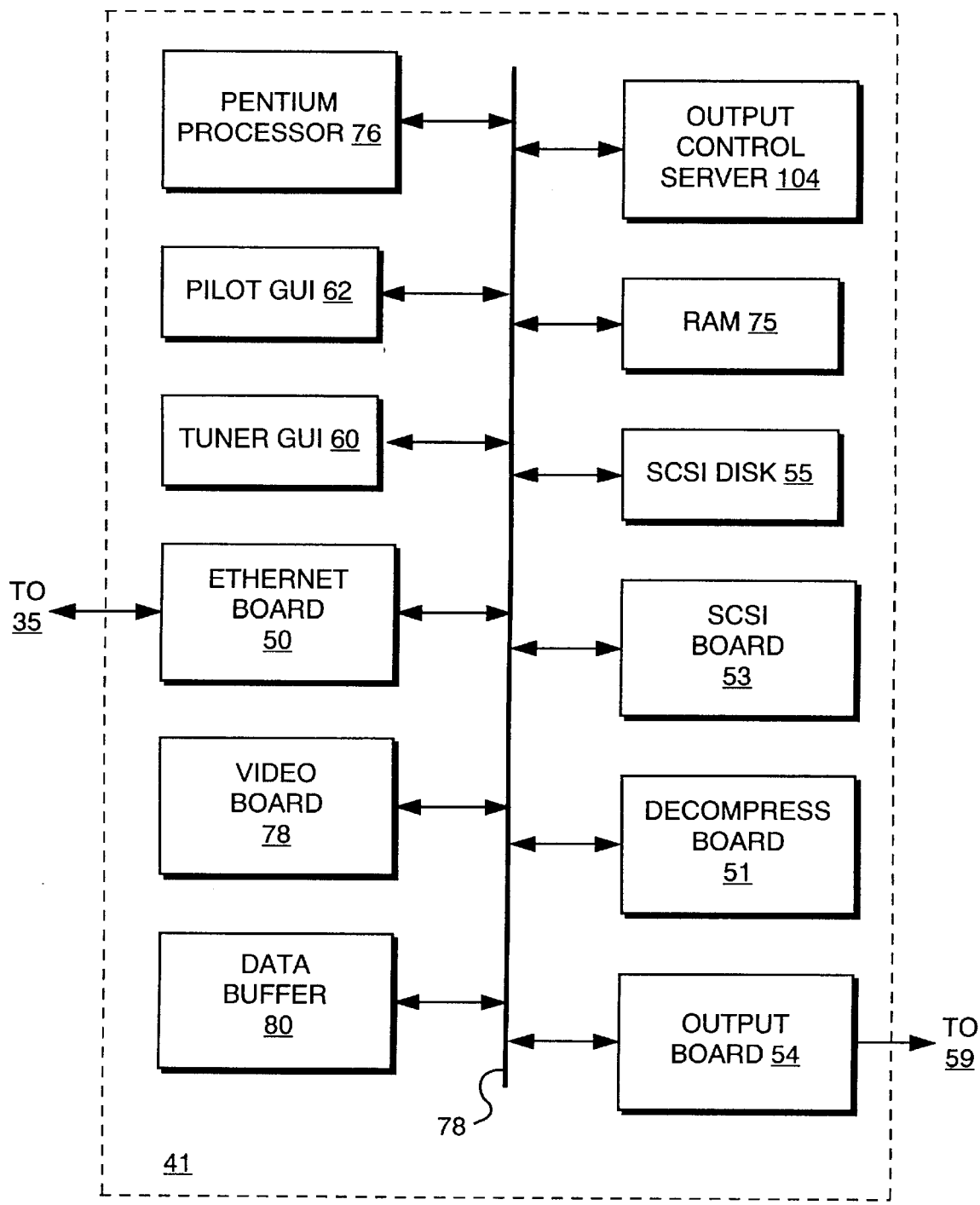
FIG. 3 is a detailed block diagram of the print drive component of the system of FIG. 2.

Turning to FIG. 3 the print drive 41, which is essentially a special purpose computer, operates on a standard computer platform such as Windows NT™ configured for efficient print driving functions. The print drive hardware includes: a central processing unit such as a 200 mhz Pentium processor 76; sufficient random access memory (RAM) 75 for running the operating system and the various applications programs of the print drive 41; a data buffer 80 for temporary data storage of image data being transferred between the print drive and other prepress system components, and for temporary data storage of data being transferred between components within the print drive 41; one or more SCSI disks or other high capacity hard drives 55; a SCSI controller 53 for providing access to and from the SCSI disk 55; a decompression board 51 for decompressing compressed image data files stored in the disk 55 or received via the data buffer 80; a fast Ethernet board 50 for facilitating transfer of data over the fast Ethernet 35 by ensuring that data is formatted according to the well known TCP/IP protocol; a video board 78 for facilitating transfer of graphical data to a monitor for observation by a system operator; a pilot graphical user interface (GUI) 62; a tuner GUI 60; and an output board 54. The output board 54 may include a proprietary or standard data transfer protocol adapter module for interfacing with output devices 59. A preferred protocol is the Agfa Print Engine Interface Specification (APIS) which is a proprietary point-to-point data transmission protocol consisting of a serial bi-directional command channel and a parallel video uni-directional data channel.

Each graphical user interface typically includes a monitor, keyboard and mouse for user interaction with the print drives 41. The tuner GUI 60 controls the configuration and operation of the print drive 41 and is based upon standard Windows NT™ technology. The pilot GUI 62 is directed to provide an interactive link between the front-end users, typically MAC™ and PC™ networked users, and the print drive operator, typically a system administrator or prepress shop manager. Preferably, the tuner GUI 60 is run locally on the print drive 41. The pilot GUI 62 is preferably run remotely but can be run locally if desired. The preferred remote GUI pilot 62 may reside in the front-ends 40 or other terminals, e.g. in computer 45, and it is designed to accommodate a number of different user interface types, such as those used on a MAC™ or a PC™.

ARCHITECTURE

Figure 4:
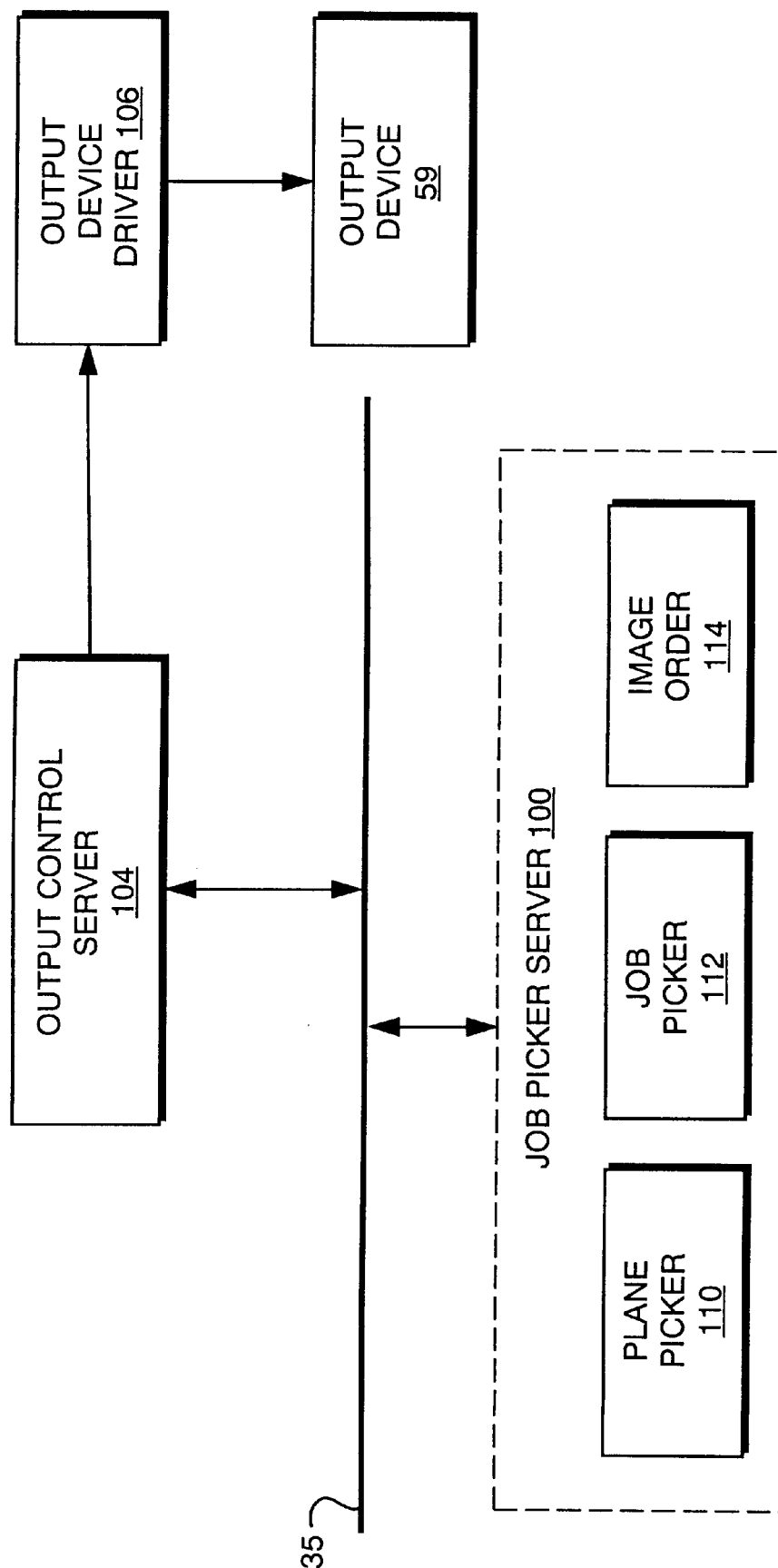
FIG. 4 is a block diagram of a preferred output architecture for job control in the prepress printing system of FIG. 2.

FIG. 4 is a block diagram of a preferred output architecture for job control in the prepress printing system of FIG. 2. The fast Ethernet network 35 links each of the components together. The architecture includes an output control server 104, an output device driver 106, an output device 59 and a job picker server 100. In turn, the job picker server 100 includes a plane picker 110, a job picker 112 and a job order estimator 114. The output control server 104 is a print drive 41 component which uses the job picker 112.

The job picker server 100 provides three software routines. The first is a job picker routine 112 for selecting a next job for printing from a predefined list of jobs. The second is a plane picker routine 110 for selecting a next plane for printing from a predefined list of available planes. And the third is a job order estimator routine 114 which estimates the order in which jobs will be printed. Each of theses software routines is dependent upon a list of processing criteria to be described hereinafter.

The output control server 104 is a print drive 41 component which uses the job picker routine 112 to select the next job for printing, and uses the plane picker routine 110 to select the next plane within that picked job for printing. A preferred system design allows for the operator of the tuner GUI 60, which is local to and controls the print drive 41, to independently use the job order estimator routine 114 to display the estimated order of imageable jobs, that is, pickable jobs which the job picker routine 112 can send to the output device 59.

The processing criteria used as a basis for selecting a job, selecting a plane or estimating the order in which jobs will print, include preferences such as:

Output Preference, i.e. whether to print after the first separation is input or, whether to print after the whole job is input.

Priority Preference, such as urgent, high, normal or low.

Creation Time and date on which the job was created.

Image Condition Preference for an image condition to be enabled. For example, print only during second shift.

Engine Name. The job may be designated as printable only on a particular type of machine, such as on an Agfa Galileo™ platemaker, or on a specific one of multiple machines of the same make and model.

Medium Name. The job may be designated as printable only on a particular type or size medium, such as on a 445×660 mm plate.

Other criteria or preferences which are useable within a prepress printing environment can be used, if desired.

When a job on the job list passes all the criteria checks it is considered pickable. A criterion, i.e. a preference, passes the criteria check when the specific condition of the criterion is met. The job picker 112 then selects, based first on the priority preference and then (if two or more jobs have the same priority) on the creation time, the next imageable job, i.e. the next job to be printed. Once a job is picked, the output control server 104 can use the job picker 112 to select and return planes in the selected job for imaging. Likewise, a GUI application can retrieve and display the estimated order of printing pickable jobs from the job list.

The output control server 104 uses the job picker 112 to select the next best job to image on an output device 59. After a next job is selected, the output control 104 makes use of the plane picker routine 110 to get each individual separation of the selected job. If desired, a GUI application could allow the user to get the estimated order in which jobs will be printed by calling a get picker list software program. When this routine is called, the job picker 112 checks all jobs in the current job list and returns a list of jobs which meets the defined criteria.

The print drive configuration includes a generic application programming interface (API) for output devices. The job control server 104 controls access to the job list information.

The job picker routine 112 maintains a local copy of preferences or job selection criteria, which are read from the print drive area of the Windows NT™ registry. These preference values are read via the print drive API and stored into memory. Whenever a preference is changed by the user, a notification is sent to retrieve the changed value from the NT Registry.

The job picker routine 112 interfaces both directly and indirectly to the following print drive components: output control; configuration server API; engine manager class; and image condition manager class.

Output control calls the job picker routine 112 to get the next job for imaging to the connected device. When the output control calls the job picker routine 112, it passes a list of media status objects which must include a print drive medium name and a flag specifying whether the required medium is loaded onto the print engine. The job identification of the picked job, and the status of the medium to be used with the picked job are returned from the job picker routine 112.

The job picker routine 112 uses the engine manager class after it has determined the best job to pick. It is called to validate the job to make sure it will physically fit on the connected engine's medium and, to make sure that the picked job is still present on the job list. The engine manager validates the job.

The job picker routine also interfaces to one of the image condition manager methods. This is used by the Picker Checks routine for checking image conditions. It specifically determines if a particular image condition is enabled.

The job picker 112 contains interfaces that are setup and used at the time the job picker 112 is actually initiated by the output control server 104. The various interfaces include an engine manager class interface, an observer interface and an image condition manager interface. The job picker routine 112 initiates an interface or class called the Engine Manager. This class is used by several different print drive components for different reasons. The job picker routine 112 uses this class for job validation.

The preference values are derived from an observer class or interface that allows the reception of notifications when certain events occur in the print drive system 41. The job picker routine 112 will attach, e.g. sign up for notification, to the print drive configuration API via its subject. This effectively causes the job picker routine 112 to be notified whenever the user modifies the settings of one or more preferences. The job picker routine 112 can then update its local preferences by re-reading them via the print drive configuration server API.

The job picker routine 112 initiates an Image Condition Manager interface during initialization. This interface is used internally by the job picker routine 112 to update a cache of image conditions that are read via the print drive configuration server API. The methods of the Image Condition Manager are available for usage by the job picker routine 112.

JOB PICKER ALGORITHM

The job picker routine 112 effectively generates a job profile for each job located on a predefined job list by applying predefined criteria, then selecting a next job to be processed from the job list by comparing the job profiles.

The print drive operator can input preference information for a new job via the tuner GUI 60. The preference information may include:

Output Preference, i.e. whether to print after the first separation is input or, whether to print after the complete job is input.

Priority Preference, such as urgent, high, normal or low.

Creation Time and date on which the job was created.

Image Condition Preference for an image condition to be enabled, such as, print after 1:00pm.

Engine Name. The job may be designated as printable only on a particular type of machine, such as on an Agfa Galileo™ platemaker, or on a specific one of multiple machines of the same make and model.

Medium Name. The job may be designated as printable only on a particular type or size medium, such as on a 445×660 mm plate.

The output preference specifies whether the job can be printed immediately after the first separation is input, or whether the whole job must be input before printing can begin.

The priority preference, such as urgent, high, normal or low, allows the user to create or modify the priority of a job. Other priorities could be used, if desired. Jobs that do not meet the priority preference are not allowed to print. The priority preference in the preferred embodiment takes precedence over all other preferences other than creation time and date. For example, if two jobs at different priorities are eligible to output, the higher priority job is picked first. However, if two jobs with identical priority preferences are eligible for output, then the job with the earliest creation time and date will print first.

The image condition preference is unique from the other preferences by enabling jobs to print which are contingent upon a particular condition precedent. These conditions can vary from customer to customer and are defined via the tuner GUI 60. For example, the operator may wish to defer printing of a particular job Z until after jobs A, D and G have been printed. Other image condition preferences include, but are not limited to, printing:

At 10:30AM on Monday, Jun. 15, 1998.

Anytime after noon on the 15$^{th}$ of the month.

Only during second shift.

Subject to an unconditional hold, i.e. not printing until specifically released by the operator.

The operator also must select a particular print engine by its engine name, and a particular type and size of medium for the job to be pickable. Other preferences could be easily added to the routine if desired, such as an operator name, a customer name, a product name, a customer prioritization number, the time and date of creation of a new job, the maximum deferral preference, etc. The maximum deferral preference is used by the job picker routine 112 after all jobs on the job list have been checked to see if they are pickable or not. All pickable jobs are associated with a particular available medium. When the available medium is actually loaded on the output device, the medium is considered selected.

When the job picker routine 112 is determining the next best job to image, it considers if the medium associated with the job is currently selected. When the medium is not currently selected, the job picker routine 112 can defer having the output device load the correct medium. The routine 112 will defer jobs that need a different medium selected and increment the current deferral count. When this deferral count is equal to the maximum deferral preference, the job picker is then allowed to pick a job that will need a new medium to be selected. The purpose for the maximum deferral preference is to allow the user to tune his or her system so that the output device will not be constantly loading a different medium on every job that is picked by the job picker routine 112. The media unloading and loading operations on an output device can be very time consuming.

Figure 6A:
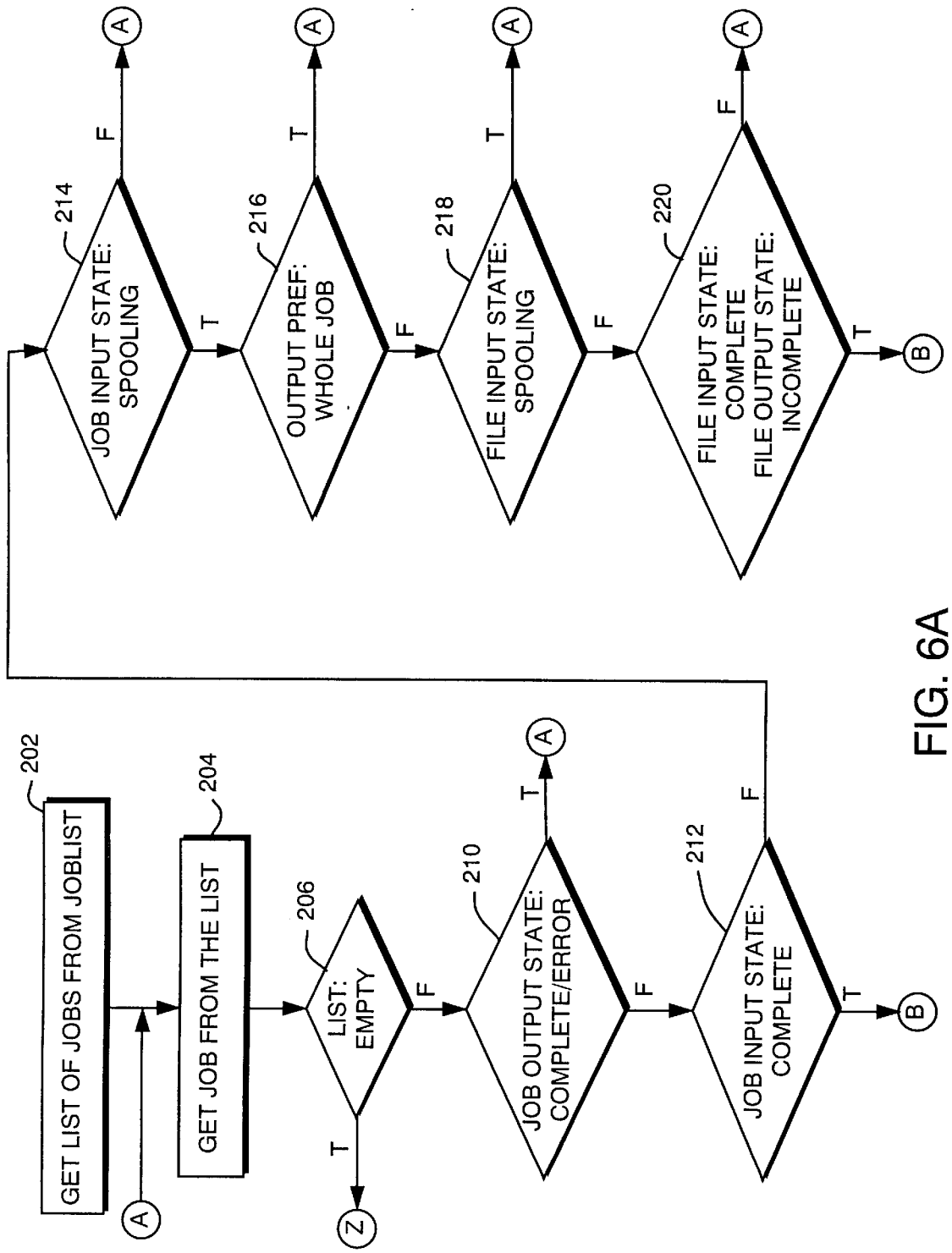
FIGS. 6A, 6B and 6C are flow chart diagrams of a preferred job selection method for use with the prepress printing system of FIG. 2.
Figure 6B:
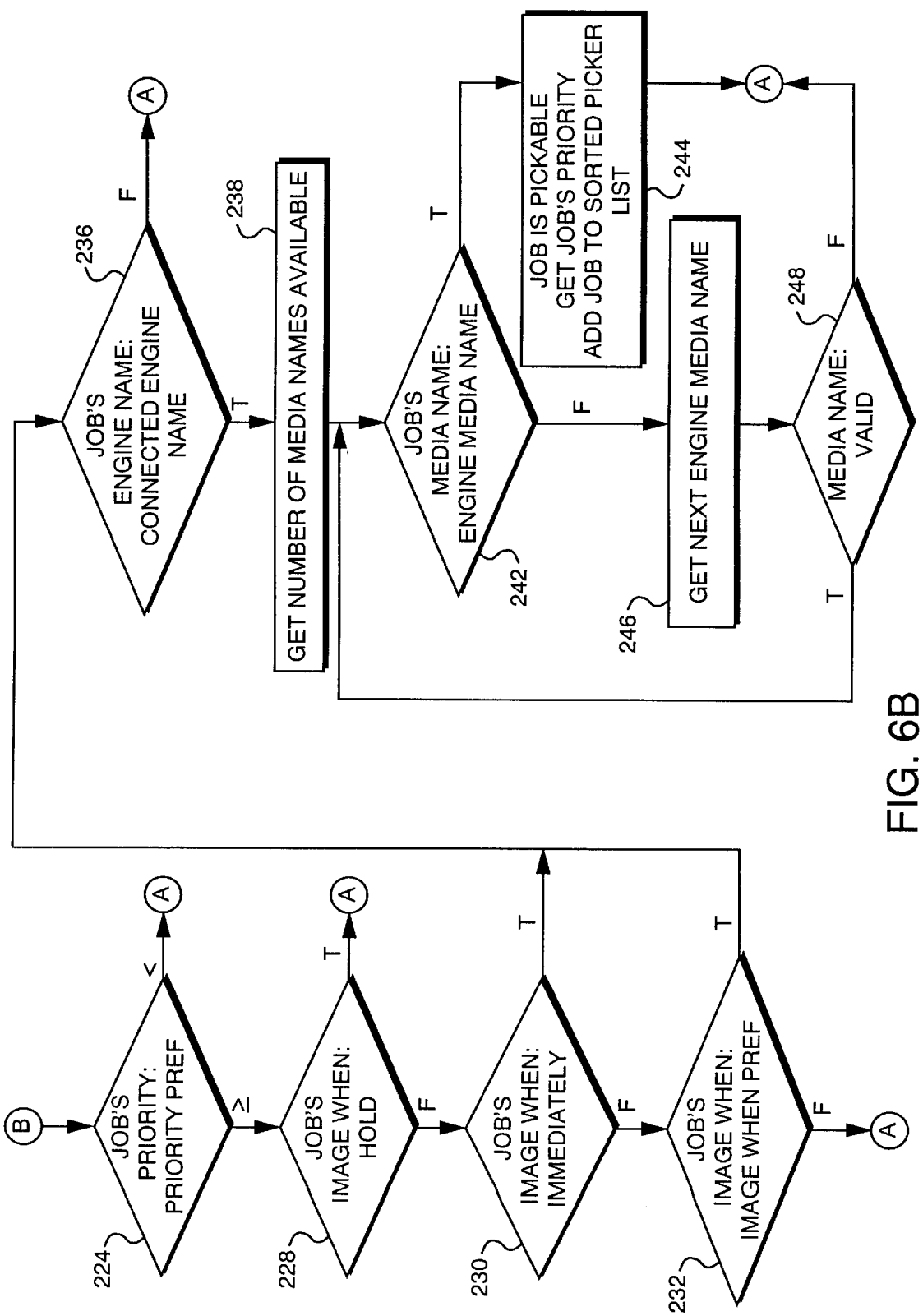
Figure 6C:
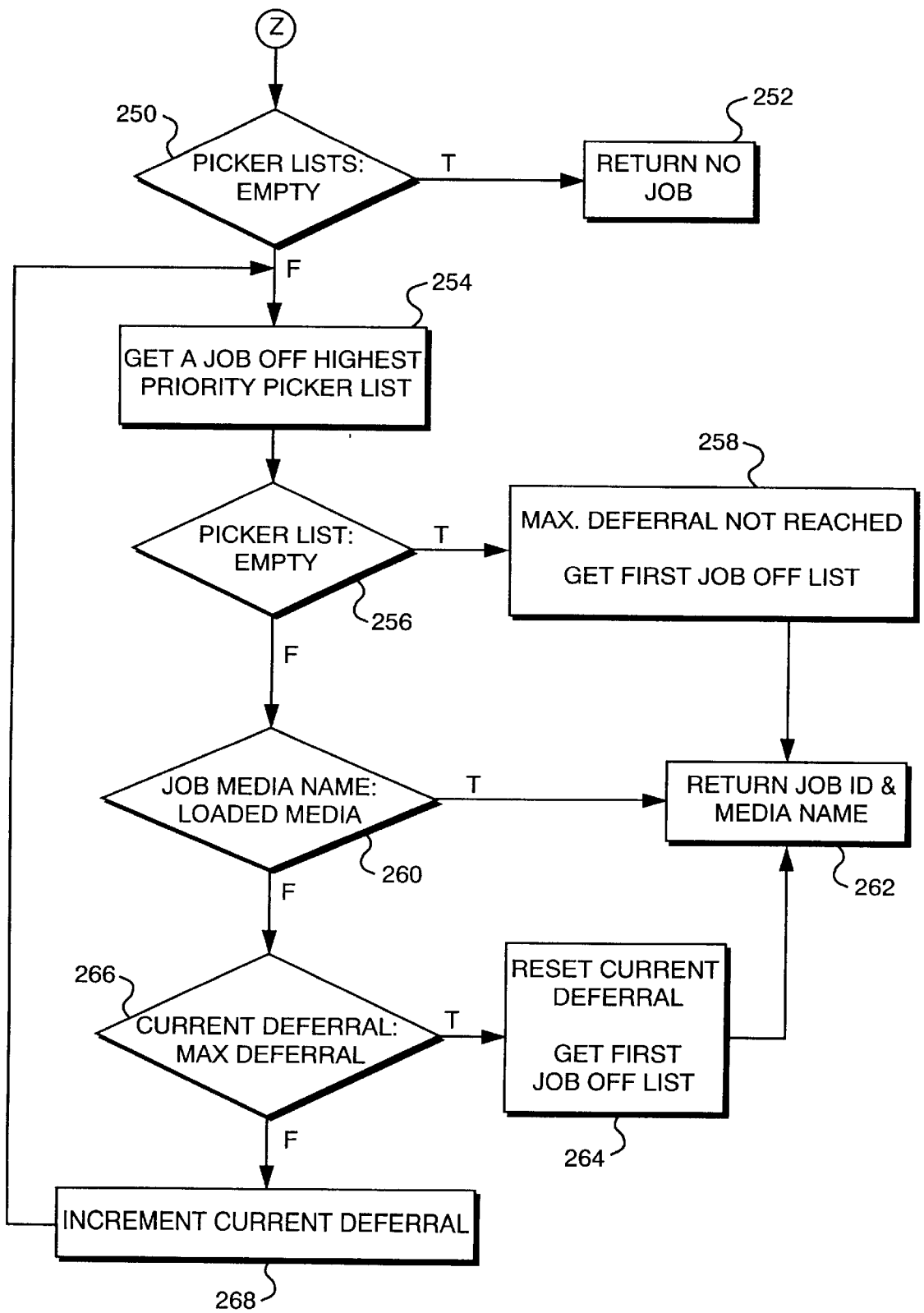

FIGS. 6A, 6B and 6C are flowchart diagrams of a preferred job selection method implemented by the job picker software 112 loaded into the print drive 41 for picking a next job for printing. The preferred method is actually a two pass procedure although a single or multiple pass variation of the same method could yield the same results. In the preferred method, the first pass as illustrated in FIGS. 6A and 6B makes a list of all pickable jobs and the second pass illustrated in FIG. 6C picks the next job to print from the list of pickable jobs. After caching the preferences locally, the job picker routine 112 calls a common private Picker Check routine which reads the current job list, via the output control server 104, into the data buffer 80. The first pass uses this locally stored job list.

The processing criteria used as a basis for selecting a job, selecting a plane or estimating the order in which jobs will be printed, includes the above criteria or preferences. Additionally, the output and input states of the job are considered. Typical job output states are queued in FIG. 5. The three possible input job states are "complete", "incomplete" or "error". An input job state of complete is realized when all the required preferences have been logged to allow a job to be pickable and when the image to be printed has been completely acquired or spooled into memory. If the required preferences have not been logged, or if the job has not been completely spooled, then the input state is considered to be incomplete.

A picker check subroutine is called from the job picker routine 112 to read the information associated with each job and check the information against the specified preferences. Each check is performed in sequence and if any checks fail to meet the criteria, the job is ineligible to be picked. See FIG. 5 for a listing of the output states.

For this example, the job list is retrieved in block 202 of FIG. 6A. In block 204 a job is selected from the job list and block 206 determines if the job list is empty. If the job list is empty, then the first pass for finding all pickable jobs is complete and no jobs are pickable. If the job list is not empty, then the current job output state (see FIG. 5) is checked in block 210. If the current job has been completed, i.e. printing is complete, or if the output state is in error, then another job is retrieved from a list in block 204. Otherwise, if the current job is incomplete, then the job input state is tested in block 212. If the current job has been completely input, then the method continues in block 224, otherwise, block 214 tests if the input state of the current job is spooling. If the current job is not spooling, then another job is retrieved in block 204. Otherwise, block 216 tests if the output preference is to print after a single separation is received, or after the whole job is received. If the output preference is to print the whole job, then another job is retrieved in block 204. Otherwise, block 218 tests if the input state of the current separation is spooling. If the current separation is spooling, then another job is retrieved in block 204. Otherwise, block 220 tests if the current separation's input state is complete and the current separation's output state is incomplete. If not true, then another job is retrieved in block 204. Otherwise, block 224 in FIG. 6B tests the current job's priority against the priority preference. If the job's priority is less than the priority preference, then another job is retrieved in block 204. Otherwise, block 228 tests for a conditional hold. If a job's image condition is an unconditional hold, then another job is retrieved in block 204. Otherwise, block 230 tests if the current job has no image condition. If true, then the method continues to block 236. Otherwise, block 232 determines if the image condition preference has been enabled. For instance, if the job is slated for printing during third shift, is that condition enabled. If not, then another job is selected in block 204. Otherwise, block 236 determines whether the job's engine name matches a connected engine name. If not, then another job is retrieved in block 204. Otherwise, a list of available media names are retrieved in block 238. Block 242 tests if the current job's medium name matches a media available on the named connected engine. If not, the next medium name is retrieved in block 246 from the media list. If the medium name is valid in block 248, then the routine loops back to block 242. Otherwise, another job is retrieved in block 204. If the current job's medium name matches the name of the media available on the named connected engine, then the current job is pickable and added to the sorted job picker list in block 244. Thereafter another job is retrieved in block 204.

When a job selected from the job list in block 204 successfully passes all the preference checks, it is added or returned to one of four newly created second pass job lists which are based, respectively, on each of the four priority preferences. After all jobs have been checked against the preferences in block 206, the job picker routine 112 starts its second pass in block 208.

The job picker's second pass consists of actually picking the next job to image. The pickable jobs that are highest in priority are always picked before lower priority jobs. Priority always takes precedence over any other criteria, except creation time and date. If two jobs both are urgent priority, then the job with the earlier creation time and date will be selected as the next job to be printed. Jobs are selected off the lists in the priority order of urgent, high, normal and low. A list is skipped if there are no job entries on it. Alternatively, if a single new job list is created rather than four new priority job lists, that new single list would order the jobs thereon by priority.

The second pass of the job picker routine 112 is outlined in FIG. 6C. If no jobs are pickable as tested in block 250, then the routine returns that finding in block 252. Otherwise, a job is retrieved from the highest priority second pass job list in block 254. If the second pass job list is not empty when tested in block 256, then print priority from that list is established by the job having the earliest creation time and date. These parameters are tested in block 258, as well as the maximum deferral preference.

The job picker routine 112 stores the engine media that are currently loaded and available for immediate printing on the print engine. A job on a second pass job list is picked if the job's intended medium is available on the engine. Otherwise, the current deferral is checked against the maximum deferral preference. If the maximum deferral value has not been reached, then the job is skipped and its output state is marked as Deferred. When the maximum deferral preference has been reached, the current deferral value is reset and the first job (on that second pass job list) which was deferred is picked as the job to image. Otherwise, the job identification number and medium name are returned in block 262. If there are not enough jobs on the second pass job list to reach the maximum deferral value, then the first job which was deferred on that list is returned as the next job to image.

If the second pass job list is not empty as tested in block 256, then block 260 tests if the job medium name matches the medium loaded on the connected engine. If true, then block 262 returns the job identification and medium name. Otherwise, block 266 tests if the current deferral matches the maximum deferral. If true, then the current deferral is reset and the first job which was deferred is removed from that second pass job list. Otherwise, the current deferral is incremented in block 268, and the routine loops back to block 254 where another job is retrieved from the highest priority list. If no more jobs are listed on the highest priority list, then a job is retrieved from the second highest priority list, etc.

After a job is picked, a validation routine is called which makes sure that the selected job for printing next is still valid to image on the currently connected engine. This check ensures that the job will fit on the engine's selected medium and also that the job is still present on the selected second pass job list. If the picked job is invalid, its output state is marked as invalid and the second pass of the job picker processes again.

PLANE PICKER ALGORITHM

The plane picker routine 110 provides a way for the output control server 104 to retrieve the next plane, i.e. the next image separation. There are three uses for this routine.

1. Check a job's image files and look for the first one that has been fully spooled without error and has not yet been output.
2. Using the collation job parameter, the plane picker routine 110 can return the same plane that is passed in, if the number of copies is greater than 0. This would be used for the case of imaging a job some number of times with Collation turned off. For example, the separations would image as CC MM YY KK.
3. Using the collation job parameter, the plane picker routine 110 can return the next image file after the one passed in, if its copies remaining is greater than 0. For example, the separations would image as CMYK CMYK.

The first case above is actually the way the job picker routine 112 checks an output state to determine if a job is ready to be imaged when the image condition preference is set to image immediately after the first separation is received. However, the main usage of this routine is by the output control server 104 to fetch the next image file for printing.

The plane picker routine 110 interfaces to both the output control server 104 and the job picker routine 112. As was previously described, the plane picker routine 110 can be used in several different ways. All callers must pass a job identification and a file name. The plane picker routine 110 will return a pointer to an image file class upon successfully finding the next plane to image, or it will return a null pointer if it fails to find a next plane to image.

Figure 7A:
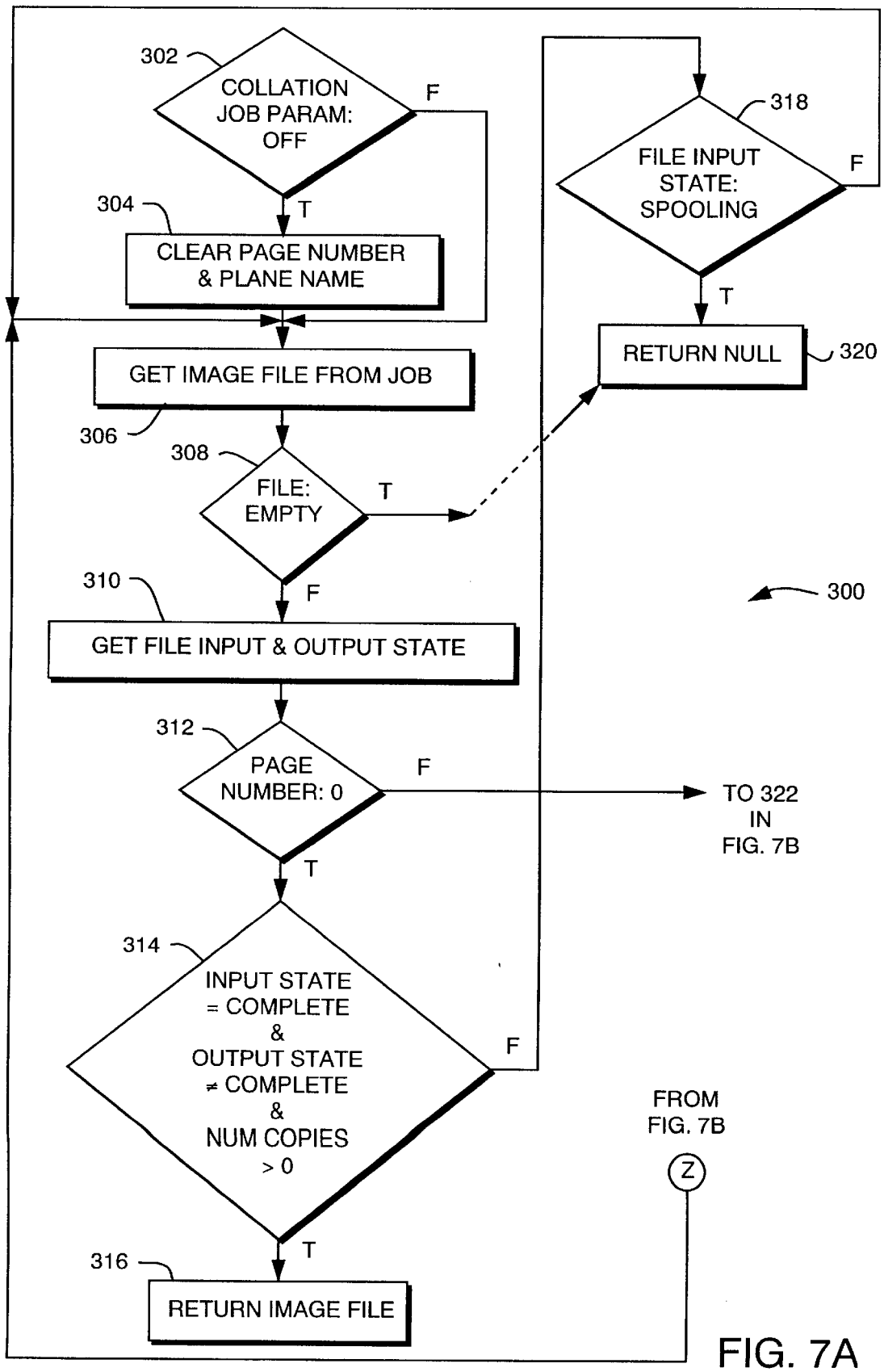
FIG. 7 is a flowchart diagram of a preferred plane selection method for use with the prepress printing system of FIG. 2.
Figure 7B:
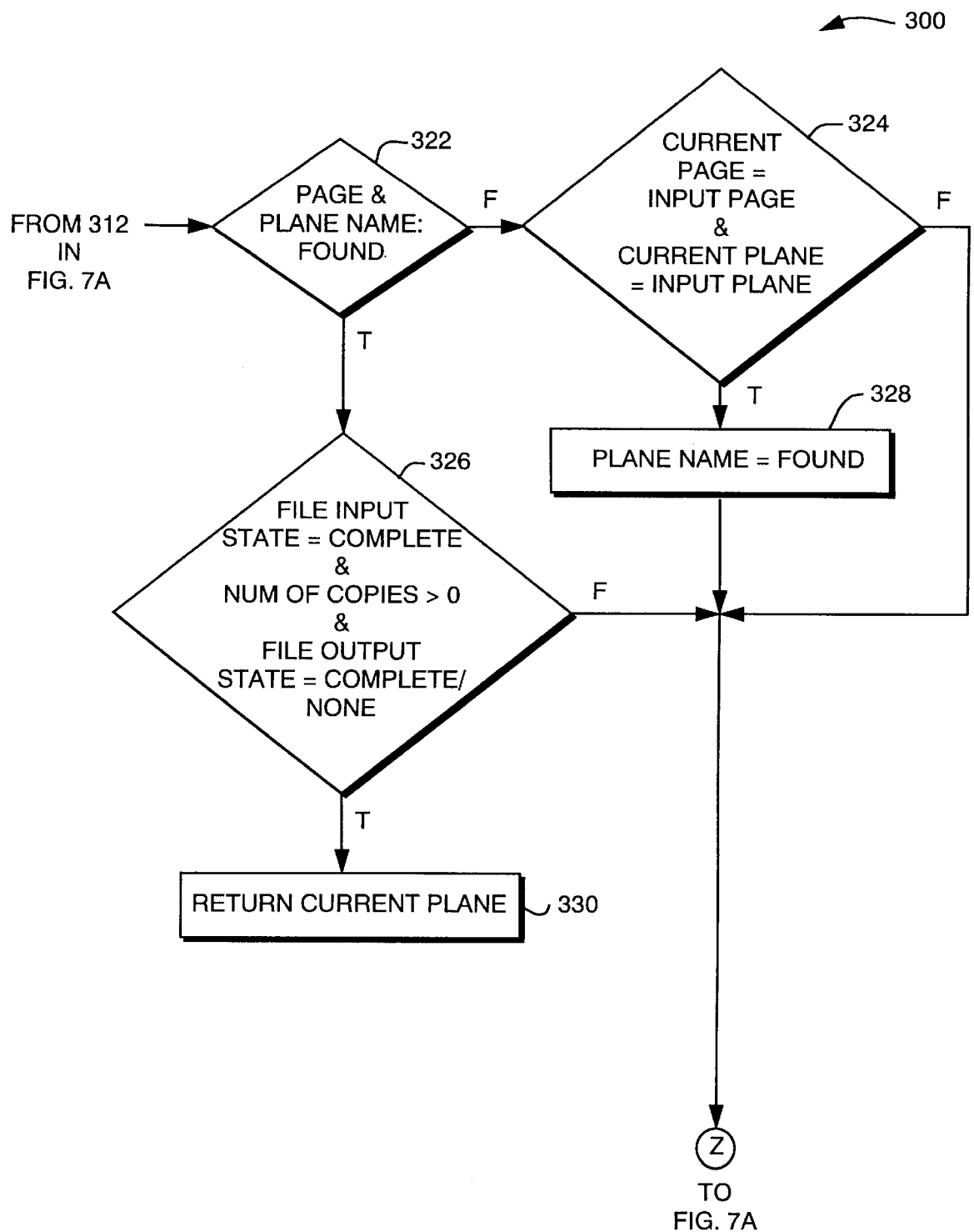

FIG. 7 is a flow chart diagram of one preferred implementation 300 of the plane picker routine 110. In block 302 if the Collation job parameter is turned on, then the process continues in block 306. If the Collation job parameter is turned off, then the page number and plane name are cleared in block 304. An image file containing the data for a given image separation is retrieved from a selected spooled job in block 306. If the file is empty in decision block 308, then a null result is returned in block 320. Otherwise, the file input and output states are determined in block 310. If the page number of the job is 0 as determined in decision block 312, then the process continues at block 322. Otherwise, block 314 tests whether the input state is complete AND the output state is incomplete AND the number of copies to be printed is greater than 0. If true, then the image file is returned in block 316. Otherwise, block 318 tests whether the file input state is spooling. If true, then a null result is returned in block 320. Otherwise, the process continues in block 306.

Block 322 tests whether the page and plane name are found. If true, then the process continues in block 326. Otherwise, the process continues in block 324. Block 324 tests whether the current page equals the input page AND the current plane equals the input plane. If true, then the plane name is retrieved in block 328. Otherwise, the process continues in block 306.

Block 326 tests if the file input state is complete AND if the number of copies is greater than zero AND if the file output state is either complete or none. If these conditions are true, then the current plane is returned in block 330. Otherwise, the process continues in block 306.

Another embodiment of the plane picker routine 110 follows the steps of the above-described job picker routine 112. In other words, the process steps are essentially the same as those in the job picker routine except that the comparisons are made between separation or plane profiles to determine which separation should be the next separation to be printed, rather than between job profiles to determine which job should be the next job to be printed.

JOB ORDER ESTIMATION ALGORITHM

The job order estimator routine 114 can be used by a GUI application to retrieve a snapshot of the pickable jobs currently on a job list, and to generate an estimated order in which jobs will be printed, subject to the existing criteria. The ordered image list is estimated, since jobs entering the system, a change of preferences, or a change in conditions can drastically change the list order in short notice.

This job order estimator routine 114 makes use of the common private method, picker checks, which reads the current job list into a local buffer. The routine 114 operates in exactly the same manner as the first pass of the job picker routine 112. After the pickable jobs are found, the routine 114 copies the job identification numbers into order of printing priority. Moreover, the job order estimator routine 114 interfaces both directly and indirectly to the following print drive components: configuration server API; engine manager class; and image condition manager class. These components were previously described in conjunction with the job picker routine 112.

It is to be understood that the above described embodiments are merely illustrative of the present invention and represent a limited number of the possible specific embodiments that can provide applications of the principles of the invention. For instance, the numerous programming parameters, preferences and other criteria described above could be varied to accommodate specific customer or operator requirements. Also the prepress hardware, operating systems, output devices and user interfaces could vary with known equivalent structures and methods. These, and other numerous and varied arrangements, may be readily devised in accordance with the principles of the invention by those skilled in the art without departing from the patented coverage of the methods and devices as claimed.

PLATESETTING

Figure 8:
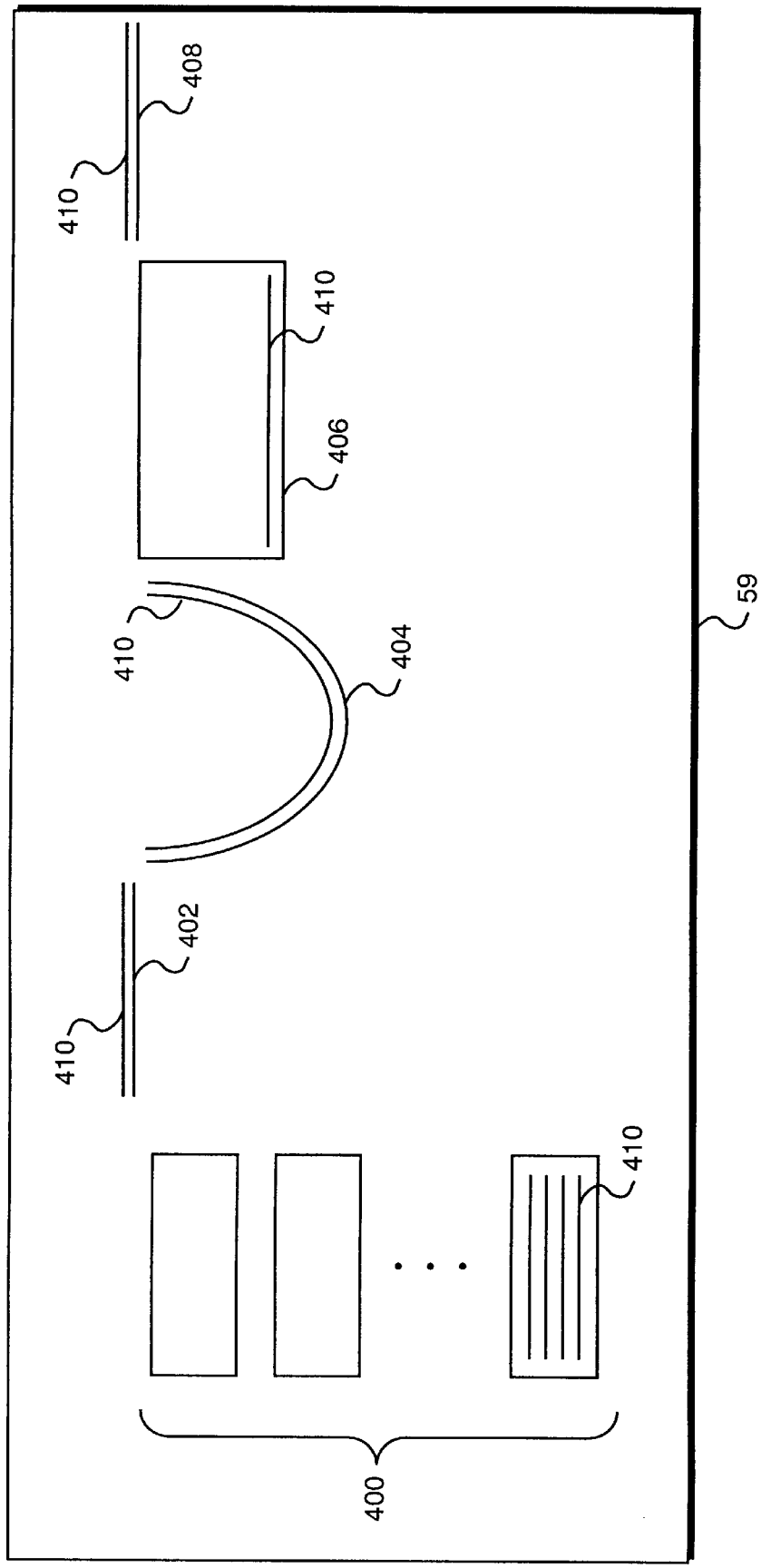
FIG. 8 is a diagram of one preferred automated platesetter for use with the prepress printing system of FIG. 2.

FIG. 8 is a diagram of the Agfa Galileo™ digital platesetter for use with the prepress printing system of FIG. 2. In a conventional platesetter, a plate or image receiving substrate is automatically retrieved from a storage bin and sent to a drum for imaging. A laser burns an image onto the plate, then sends the plate to a processor for chemically developing the image. After the burned plate is removed from the drum, a second plate is retrieved from the storage bin and sent to the drum for imaging.

In the platesetter of FIG. 8, a plate 410 is transferred from a bin 400 to the staging area 402, then to the drum 404 for imaging. While the plate is being burned in the drum 404, a next plate is retrieved from the bin 400 and sent to the staging area 402 where it awaits the completion of the imaging of the plate 410 within the drum 404. This early preparation is referred to as plate overlapping in the system workflow. When the imaging is complete, the burned plate 410 is simultaneously extracted from the drum while the next plate 410 is sent from the staging area 402 into the drum 404. In this way, valuable time is saved and the efficiency of the platesetter 59 is improved. In fact, FIG. 8 illustrates that each stage of the platesetter is being utilized throughout the platemaking process for ultimate efficiency. Note that there are plates 410 in the bins 400, a plate 410 in the staging area 402, a plate 410 being imaged in the drum 404, a plate 410 in the chemical developing bath 406, and a plate 410 in the output area 408.

A computer-to-plate device such as the Agfa Galileo™ includes multiple mutually exclusive stages, i.e. preparing a plate for input, imaging a plate, and processing a plate, all of which can occur concurrently. Plate preparation involves mechanical activity which if performed in serial with the imaging of a plate, reduces the rate at which plates may be imaged by the system. There is a performance benefit to overlapping plate preparation with imaging.

A computer-to-plate device is equipped with a set of bins, which may be raised/lowered to position for picking a plate. Each bin contains a cassette filled with plates which have specific attributes (e.g. width, height, thickness, substrate).

A page buffering system manages print jobs, which are comprised of a set of planes. Each job is configured to output on a target device (a specific model) which has a target media type with the specific attributes. Hence, each plane is configured to output on a specific target media type.

The page buffering system is responsible for interfacing with the connected output device in order to: a) monitor attributes of media available on the output device; b) configure the output device to prepare media for a plane; and c) image a plane to the output device. The page buffering system is responsible for managing the overlap of these functions in order to achieve the optimal system throughput available by the output device. In order to accomplish this, a multi-threaded design is necessary to: identify the next plane for imaging; prepare the next plate; and, to image planes which have completed preparation.

A Pick Plane thread has knowledge of the attributes of plates available on the connected device, and picks the next plane on the page buffering system which can be imaged on the available plates. The plate type loaded in the bin currently in the load position of the device is considered the currently "selected" media type. The Pick Plane thread will select a plane for this media type. If none are suited for this media type, a plane for an alternate available media type will be selected. When the Pick Plane thread selects a plane for output, that plane is added to a list of planes picked for output. When added to this list the plane is enqueued and the Preparation Status of the plane is set to "Enqueued". When the preparation of a plane is completed successfully, the Preparation Status of the plane is set to "Completed". When the preparation of a plane is completed unsuccessfully, the Pick Plane thread determines if the failure is due to an out-of-media condition. If so, the Pick Plane thread attempts to find an alternate bin with identical plate attributes. If such a bin is found, the media preparation is re-tried on the alternate bin. If no such bin is found, or if the failure is not due to an out-of-media condition, then the Preparation Status of the plane is set to "Error".

An Imaging thread is responsible for processing a plane for imaging to the device. When the device is in a state capable of imaging, the Imaging thread scans the list of picked planes looking for the planes whose Preparation Status are not "Enqueued". If any plane in the list has a Preparation Status of "Error", then the device cannot be used for imaging until a plane is properly prepared. If any plane in the list has a Preparation Status of "Successful", then the Imaging thread processes the plane on the prepared plate. The user is allowed to configure a system preference which determines whether or not the page buffering system should retry planes which complete imaging in error, or else cancel processing the job. If the Imaging thread completes imaging of the plane successfully, then the processing for this instance of the plane is complete. If the Imaging thread finishes imaging the plane in error, and the retry plane preference is set, the plane in error must be re-imaged on another plate. However during the course of imaging this plane, a plate has been prepared on the device for the subsequent plane. If the prepared plate has the same attributes as the plate used to image the plane in error, then the system will steal the prepared plate to re-image the plane which was in error, and another plate will be prepared for the next plane. If the prepared plate has different attributes than the plate used to image the plane in error, then the plane in error will be imaged later.

Conditions may exist with a computer-to-plate device where a plate has been prepared for imaging, but never used. A device cannot un-prepare a plate. Therefore two options are available: a) find a plane to image on the plate which has been prepared; or b) reset the device to flush the plate from the computer-to-plate device. In order to accommodate option a), it is necessary to know the attributes (width, height, thickness, substrate) of the plate which has already been prepared. This plate will be provided as the only available media type available to the Pick Plane thread when attempting to pick a plane for processing. The net result is that only planes which are set-up to image on a plate with attributes matching those of the pre-existing prepared plate will be selected. When the Pick Plane thread selects a plane for output on a pre-existing prepared plate, that plane is added to a list of planes picked for output. The Preparation Status of the plane is set to "Enqueued" and then "Completed", since no preparation activity is necessary for the plane.

The Galileo™ workflow has a requirement to permit users to RIP a job for a single plate size, and then later redirect the job to another plate. In redirecting the job to another plate, it may be necessary to offset the image in the fastscan direction to put the "bend position" of the plate in the proper position on the new plate. Referring to FIG. 8, the fastscan direction is defined as the angular direction which the laser moves along the arc of the drum 404, whereas the slowscan direction is defined as the direction of the laser moving perpendicular to the plane of the drawing. The "bend position" refers to the position of the plate relative to the printing press whereby the printing press grips the plate via notches along the edge of the plate. The bend position can vary from plate to plate, or from press to press, thus if the same image is to be burned onto two plates (typically different size plates) having different bend positions, then the plate or the imaging onto the plate must be offset by some corresponding distance.

A site may use two different presses which use at least two different plates. The plate sizes are the same width, but different height. Users may RIP some jobs to a smaller plate size, then redirect the job to a larger plate size due to press or plate availability. In that case, the image must be offset in the fastscan direction to compensate for the larger plate size, and to align the intended bend position of the image for the new plate. Default behavior should be to offset the image to the edge of the larger plate, thus assuming an identical plate position. This eliminates the need for the user to calculate a custom offset. However, as bend positions may differ between presses, it is required to provide users with the option to specify a custom offset in units of inches of millimeters.

Figure 9A:
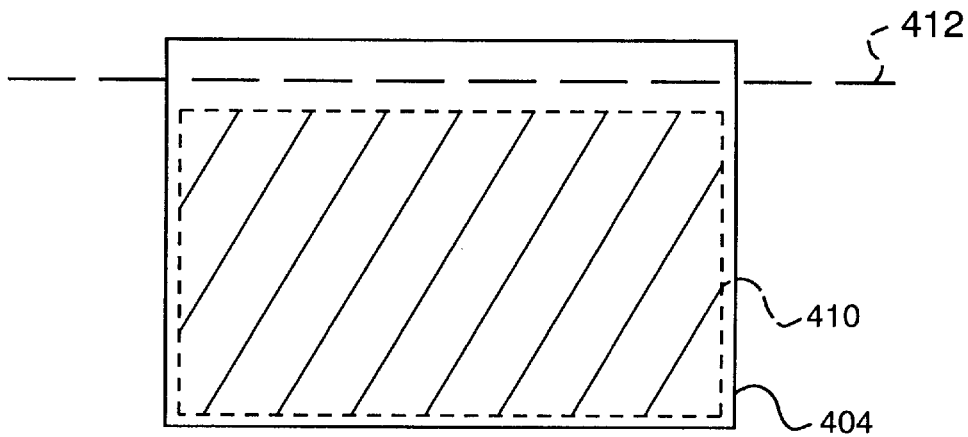
FIG. 9A, 9B and 9C illustrate different plate positions or offsets during drum imaging.
Figure 9B:
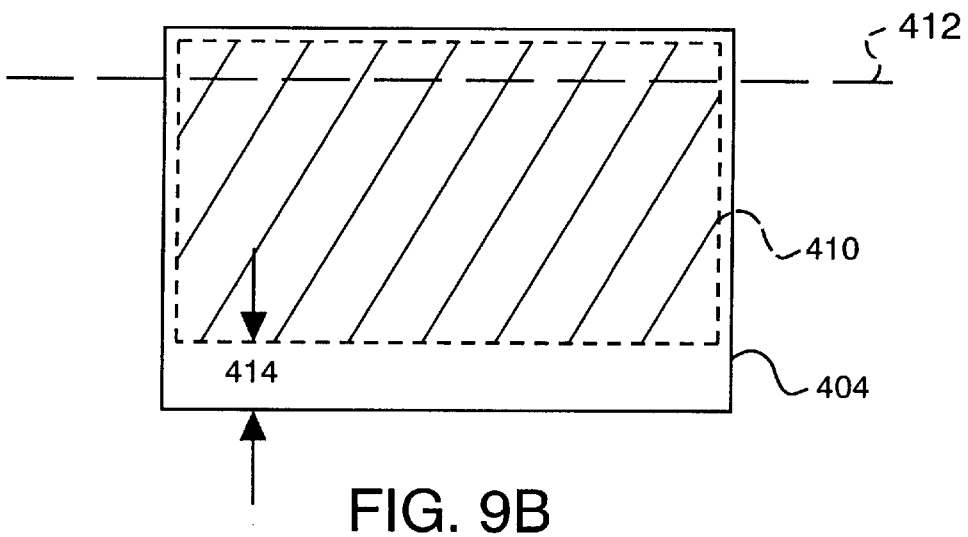
Figure 9C:
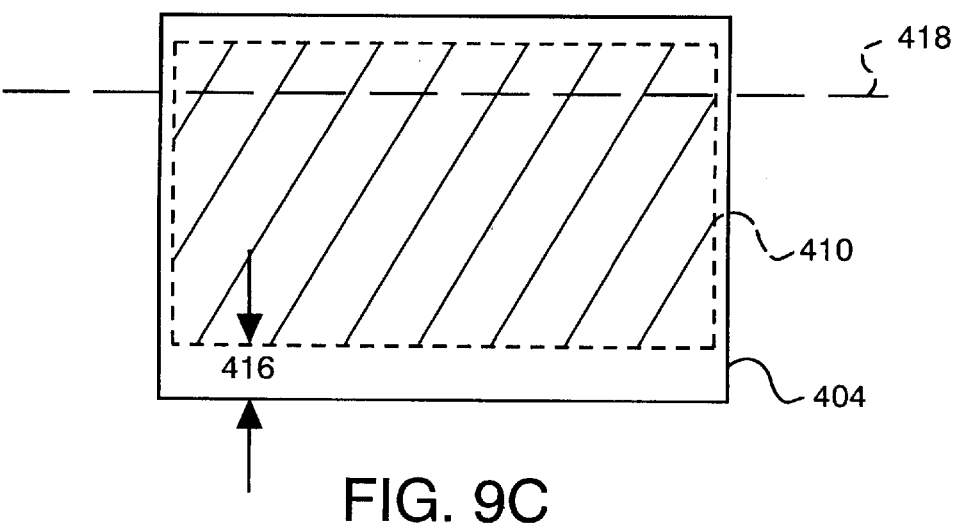

FIGS. 9A, 9B and 9C illustrate top views of the imaging drum 404 of the platesetter 59 of FIG. 8, each drum 404 containing an image receiving substrate or plate 410 in a different offset position. The plates 410 in these figures are being used for jobs redirected from smaller plates. In each case the same image is being burned onto the plates 410. FIG. 9A illustrates a large plate 410 without offset (i.e. in a default position of the drum 404) having the same bend position 412 as used for a smaller plate. FIG. 9B illustrates a large plate 410 using the default offset 414 to yield the same bend position 412 as used for a smaller plate. FIG. 9C illustrates a large plate 410 using a custom offset 416 to yield a different bend position 418.

The print drive allows the user to optionally specify a custom offset. A new field is available through preprogrammed software to indicate the desire to shift the image, and to enter an accompanying offset value, for instance in inches or millimeters. This field is only active when supported by the selected device, e.g. the Agfa Galile™ platesetter. The default offset value corresponds to the difference between the fastscan dimension of the original plate media and the redirected plate media.

The Image Offset Position setting is only available for certain devices. If the setting and its associated Shift Image checkbox on the user interface are both dimmed, then the selected device does not support the Image Offset Position. In this case, the print drive system automatically ignores this parameter in all of its calculations. Otherwise, it is possible to view and change the image offset for a job.

Image offset values are preferably displayed in either metric or English measurement form. Checking the Shift Image checkbox always initiates automatic calculation of an appropriate image offset value for the job and its currently selected device and media combination. The automatic calculated value may be overridden, if desired, by the user typing in a different value. If the new value is out of range, an error message will be displayed. Un-checking the Shift Image checkbox automatically clears the image offset value, i.e. it sets it to zero. Once the desired image offset value is entered, it must be applied before it is written to the job. An attempt to apply an invalid image offset value will result in an error message. If a job contains an image offset value, it will have an impact on what media type choices are available in the Media menu. This is because the Pilot GUI uses the size of the job and the job's image offset value when calculating the list of available media choices.

The print drive software also offers a mechanism for the user to place a slug line or plane identifier onto the media at output time. This slug line feature can be continually activated or it can be turned on and off on a per job basis. The slug line is placed in a fixed position, centered on the gripper edge on a plate, and centered on the head punch edge on film. Information contained in the slug line includes plate, operator, and job descriptive information. The slug line information may include, but is not limited to: job name; time stamp; plane name; page number; and user defined graphics. Also, the slug line can be burned into the image receiving substrate with a laser beam from the laser, or it can be marked by any other know means, such as with ink or by cutout.

It is important to recognize that in the above description, generally one whole surface of the plate, i.e. the image receiving substrate, is made of image receiving material. However, the predefined area of the predefined image is actually the area on the plate which receives the image from the RIP. Portions of the plate which are not imaged by the RIPed image file are considered to be outside of the predefined area of the predefined image. Moreover, when a plate is installed onto a printing press, printed matter is produced only from a selected area of the plate. It is thus desirable to position the slug line information on the portion of the plate which is outside of the predefined area of the plate, so that the slug line information will be readable from the plate, but will not be printed out by the printing press.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

We claim:

1. A method for automatically processing a job in a prepress printing environment, the method comprising the steps of:
   (1A) moving an image receiving substrate from a storage bin to a staging area;
   (1B) moving said image receiving substrate from the staging area into a drum;
   (1C) imaging a predefined area of said image receiving substrate in the drum with a laser while simultaneously moving a next image receiving substrate from the storage bin to the staging area;
   (1D) upon completion of the imaging of the image receiving substrate in the drum, simultaneously (a) moving the image receiving substrate from the drum into a processing area for developing an image on the image receiving substrate, and (b) moving the next image receiving substrate from the staging area into the drum; and
   (1E) repeating steps (1C) and (1D) until the job is completed.

2. The method of claim 1 wherein step (1B) further comprises offsetting the position of the image receiving substrate to alter the location upon the image receiving substrate where the image will be burned.

3. The method of claim 1 wherein step (1C) further comprises offsetting the laser position to alter the location upon the image receiving substrate where the image will be burned.

4. The method of claim 1 wherein step (1C) further comprises imaging a slug line on the image receiving substrate outside of the predefined area.

5. The method of claim 4 wherein said slug line comprises a job name, a print drive job identification, a time stamp, a plane name, a page number or user-defined graphics.

6. A prepress printing system for automatically processing a print job, the system comprising:
   a storage bin for storing cassettes of image receiving substrates;
   a staging area for receiving and preparing one of the image receiving substrates for entry into an imaging drum;
   the imaging drum for receiving the image receiving substrate from the staging area and for supporting the image receiving substrate during imaging;
   an imaging assembly including a movable laser for burning an image onto the image receiving substrate in the drum;
   a print drive system providing a combination of user interaction and automated control of the prepress printing system; and
   an application program run in the print drive system for controlling the simultaneous transfer of image receiving substrates from the storage bin to the staging area, from the staging area to the imaging drum, and from the imaging drum to a chemical developing bath.

7. A method for automatically processing a job in a prepress printing environment, the method comprising the steps of: transferring an image receiving substrate from a storage bin to a staging area; positioning the image receiving substrate at the staging area; transferring and positioning the image receiving substrate with an offset into an imaging drum; and burning an image onto the image receiving substrate in the imaging drum with a laser beam.

8. The method of claim 7 wherein the image receiving substrate is offset prior to reaching the staging area.

9. The method of claim 7 wherein the image receiving substrate is offset during transfer to the staging area.

10. The method of claim 7 wherein the image receiving substrate is offset at the staging area.

11. The method of claim 7 wherein the image receiving substrate is offset after transfer to the staging area.

12. The method of claim 7 wherein the image receiving substrate is offset during transfer into the imaging drum.

13. The method of claim 7 wherein the image receiving substrate is offset after transfer into the imaging drum.

14. A method for automatically processing a job in a prepress printing environment, the method comprising the steps of:
   positioning an image receiving substrate in an imaging drum;
   burning a predefined image onto a predefined area of the image receiving substrate in the imaging drum with a laser beam; and
   adding job identification information onto the image receiving substrate outside of the predefined area.

15. The method of claim 14 wherein the job identification information comprises: a job name, a print drive job identification, a time stamp, a plane name, a page number or user-defined graphics.

16. The method of claim 14 wherein the job identification information is burned outside of the predefined area of the image receiving substrate with the laser beam.

17. The method of claim 14 wherein the job identification information is marked outside of the predefined area of the image receiving substrate with ink.

18. The method of claim 14 wherein the the job identification information is marked outside of the predefined area of the image receiving substrate via cutouts in the substrate.

* * * * *